United States Patent
Yoshida

[11] Patent Number: 6,023,994
[45] Date of Patent: Feb. 15, 2000

[54] DOUBLE-SIDED RECLINING APPARATUS

[75] Inventor: Tomonori Yoshida, Yokohama, Japan

[73] Assignee: Ikeda Bussan Co., Ltd,, Ayase, Japan

[21] Appl. No.: 09/138,012

[22] Filed: Aug. 21, 1998

[30] Foreign Application Priority Data

Aug. 22, 1997 [JP] Japan .................................. 9-240227

[51] Int. Cl.[7] .................. B05G 5/06; B60N 2/02
[52] U.S. Cl. ........................... 74/530; 297/367; 297/373; 297/378.12
[58] Field of Search ................. 74/530; 188/69, 188/82.7; 297/354.12, 361.1, 362–367, 378.12, 373

[56] References Cited

U.S. PATENT DOCUMENTS

| | | | |
|---|---|---|---|
| 5,161,856 | 11/1992 | Nishino | 297/367 |
| 5,681,086 | 10/1997 | Baloche | 297/367 |
| 5,685,611 | 11/1997 | Eguchi et al. | 297/367 |
| 5,727,846 | 3/1998 | Yoshida | 297/373 |
| 5,749,624 | 5/1998 | Yoshida | 297/367 |
| 5,749,626 | 5/1998 | Yoshida | 297/367 |
| 5,762,400 | 6/1998 | Okazaki et al. | 297/367 |
| 5,785,386 | 7/1998 | Yoshida | 297/367 |
| 5,873,630 | 2/1999 | Yoshida et al. | 297/367 |
| 8,881,854 | 3/1999 | Rougnon-Glasson | 297/367 X |

FOREIGN PATENT DOCUMENTS 9-28496  2/1997  Japan .

Primary Examiner—Thomas R. Hannon
Assistant Examiner—Brandon C. Stallman
Attorney, Agent, or Firm—Foley & Lardner

[57] ABSTRACT

A double-sided reclining apparatus comprises outside and inside reclining devices, each comprising a base and an arm having an inner toothed portion, a pivotal shaft through which the arm is rotatably supported on the base, and a set of cam and toothed block in cam-connection. The cam and the toothed block cooperate with each other to cause meshing/unmeshing action of the reclining apparatus. The cam has a locking-action cam-profile surface portion and an unlocking-action cam-profile surface portion, whereas the toothed block has a locking-action cam-contour surface portion and an unlocking-action cam-contour surface respectively brought into cam-connection with the locking-action cam-profile surface portion and the unlocking-action cam-profile surface portion. In the locked state, the relative distance between the unlocking-action cam-profile surface portion and the unlocking-action cam-contour surface portion included in the inside reclining device is shorter than the relative distance between the unlocking-action cam-profile surface portion and the unlocking-action cam-contour surface portion included in the outside reclining device, for providing a mechanical phase-lead of the inside reclining device with respect to the outside reclining device.

5 Claims, 7 Drawing Sheets

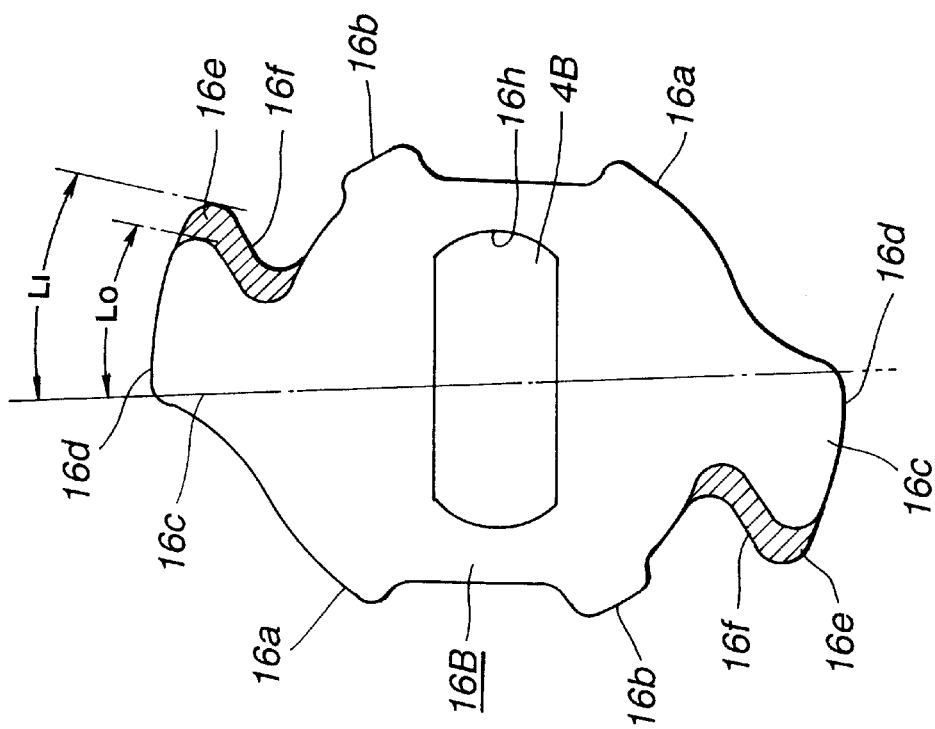
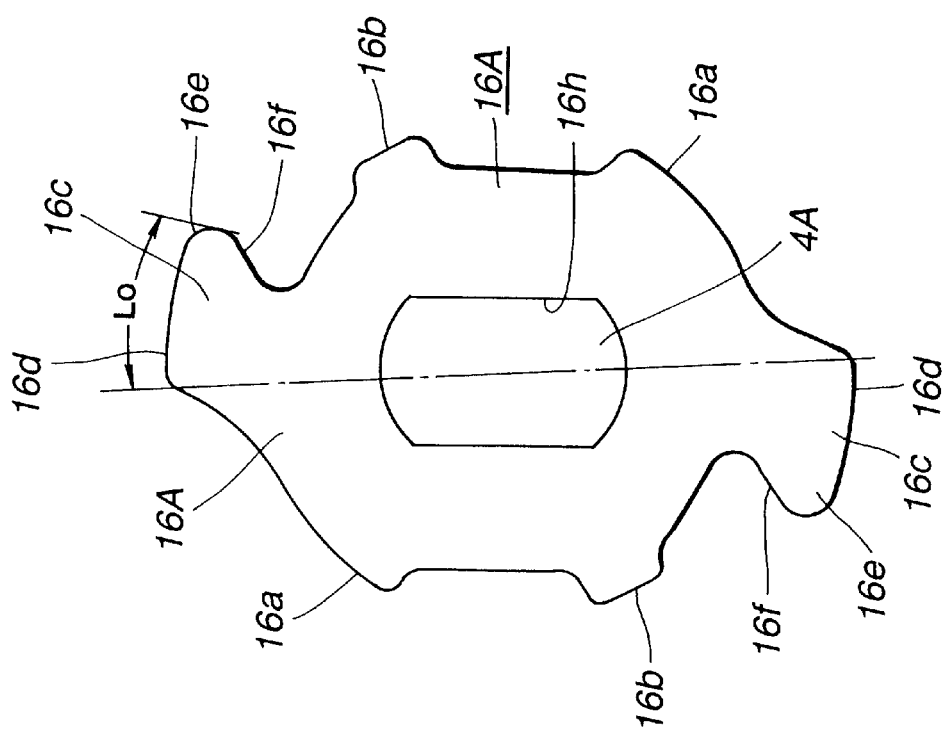

DOUBLE-SIDED RECLINING APPARATUS

BACKGROUND OF THE INVENTION

1. Field of the Invention

The present invention relates to a double-sided reclining apparatus, and more particularly to a rotary-cam type double-sided reclining apparatus in which a pair of reclining devices, mechanically linked to each other, are attached to both sides of an automotive seat, and the locking and unlocking action of each of the reclining device is made by way of a rotary motion of the rotary cam mechanically linked to a reclining lever to ensure the angular adjustment of a seat back relative to a seat cushion.

2. Description of the Prior Art

On earlier model cars, a double-sided seat reclining apparatus is ordinarily used for enhancing a holding performance of a seat back adjusted at a desired angular position and for providing a long-life reclining device. Generally, each reclining device constructing the double-sided reclining apparatus is comprised of a rotary-cam type reclining device which has a stationary base fixedly connected to seat cushion, a rotatable arm fixedly connected to a seat back and rotatably supported by the base, at least one toothed block slidably guided in the two opposing parallel side walls in the base, a reclining lever, and a rotary cam which is usually fixedly connected to the pivot shaft of the reclining lever, and which acts to mesh or unmesh the toothed block with or from the inner toothed portion of the arm by way of rotation of the rotary cam. One such conventional double-sided reclining apparatus has been disclosed in Japanese Patent Provisional Publication No. 9-28496, assigned to the assignee of the present invention and corresponding to U.S. Pat. No. 5,727,846, issued Mar. 17, 1998 to Tomonori Yoshida. The double-sided reclining apparatus disclosed in the Japanese Patent Provisional Publication No. 9-28496 is characterized by the difference between a cam profile of a rotary cam included in a locking/unlocking mechanism of a first reclining device (corresponding to an outside reclining device employing a reclining-lever handle) and a cam profile of a rotary cam included in a locking/unlocking mechanism of a second reclining device (corresponding to an inside reclining device not employing a reclining-lever handle), thereby permitting a mechanical phase-lead of the inside reclining device with respect to the outside reclining device. This mechanical phase-lead provides a stable reclining action, while insuring a correct feel of the reclining-lever action. In the double-sided reclining apparatus disclosed in the Japanese Patent Provisional Publication No. 9-28496, to ensure the slight mechanical phase-lead, the cam profile of the cam included in the inside reclining device is formed with at least one raised portion being enlarged greater than a cam profile of the cam included in the outside reclining device. The raised portion of the cam profile of the cam included in the inside reclining device is formed in such a manner as to be locally enlarged mainly radially. Such a radially enlarged, raised portion tends to produce the difference between the contact area of the cam profile of the cam included in the outside reclining device with the toothed block included in the outside relining device and the contact area of the cam profile of the cam included in the inside reclining device with the toothed block included in the inside reclining device. Particularly, the contact area of the inside-reclining-device cam profile with at least one phase-leading, radially-enlarged raised portion is less than the contact area of the usual cam profile (the outside-reclining-device cam profile with no raised portion). Thus, in case of application of heavy load, such as impact load, to the arm or to the seat back, with the outer toothed portion of the toothed block meshed with the inner toothed portion of the arm, the impression or indentation of the cam-contour surface of the toothed block, created by the raised portion, tends to increase gradually. There is a possibility that the gradually-increased impression on the cam-contour surface of the toothed block results in insufficient meshed-engagement between the outer toothed portion of the toothed block and the inner toothed portion of the arm. This reduce the mechanical locking strength of the inside reclining device not employing the reclining lever.

SUMMARY OF THE INVENTION

Accordingly, it is an object of the invention to provide a double-sided reclining apparatus which avoids the aforementioned disadvantages of the prior art.

It is another object of the invention to provide a double-sided reclining apparatus which permits a mechanical phase-lead of an inside reclining device (employing a reclining-lever handle) with respect to an outside reclining device (not employing a reclining-lever handle) without lowering the mechanical locking strength of each of the inside and outside reclining devices under a condition where the double-sided reclining apparatus is conditioned in its locked state.

In order to accomplish the aforementioned and other objects of the present invention, a double-sided reclining apparatus, comprises a first reclining device equipped with a reclining-lever handle and a second reclining device, each comprising a base adapted to be fixedly connected to a seat cushion, an arm adapted to be fixedly connected to a seat back and having a first toothed portion, a pivotal shaft through which the arm is rotatably supported on the base, a set of cam and toothed block in cam-connection with each other, the toothed block having a second toothed portion meshable with and unmeshable from the first toothed portion, the cam and the toothed block cooperating with each other for causing meshed-engagement of the second toothed portion with the first toothed portion through a rotary motion of the cam in a first rotational direction to lock the reclining device, and for causing disengagement of the second toothed portion from the first toothed portion through a rotary motion of the cam in a second rotational direction opposed to the first rotational direction to unlock the reclining device, the cam and the toothed block have a plurality of cam-connection points in a cam-profile surface of the cam and a cam-contour surface of the toothed block, and a connecting member through which the cam included in the first reclining device is mechanically linked to the cam included in the second reclining device, wherein the cam of each of the first and second reclining devices has a locking-action cam-profile surface portion for holding the toothed block at a locked position and an unlocking-action cam-profile surface portion being continuous with the locking-action cam-profile surface portion and provided for sliding the toothed block to an unlocked position, and the toothed block has a locking-action cam-contour surface portion brought into cam-connection with the locking-action cam-profile surface portion, and an unlocking-action cam-contour surface portion brought into cam-connection with the unlocking-action cam-profile surface portion, and wherein, under a condition where the first and second reclining devices are held at their locked positions, a relative distance between the unlocking-action cam-profile surface portion of the cam included in the second reclining device and the unlocking-action cam-contour surface portion of the toothed block included in the second reclining device is shorter than a relative distance between the unlocking-action cam-profile surface portion of the cam included in the first reclining device and the unlocking-action cam-contour surface portion of the toothed block included in the first reclining device, for providing a mechanical phase-lead of the second reclining device with respect to both locking and unlocking actions of the first reclining device.

According to another aspect of the invention, a double-sided reclining apparatus for an automobile seat, comprises an inside reclining device adapted to face a center line of an automotive vehicle and an outside reclining device equipped with a reclining-lever handle and adapted to face apart from the center line, each of the inside and outside reclining devices comprising a base adapted to be fixedly connected to a seat cushion, an arm adapted to be fixedly connected to a seat back and having a pair of diametrically opposed inner toothed portions, a pair of toothed blocks, each having at least a locking-action cam-contour surface portion and an unlocking-action cam-contour surface portion, and an outer toothed portion meshable with and unmeshable from an associated one of the inner toothed portions of the arm, a rotary cam being formed on an outer periphery thereof with at least a locking-action cam-profile surface portion and an unlocking-action cam-profile surface portion respectively being in cam-connection with the locking-action cam-contour surface portion and the unlocking-action cam-contour surface portion, a pivotal shaft through which the arm is rotatably supported on the base, the pivotal shaft firmly fitted to the cam for causing meshed-engagement of the outer toothed portions of the pair of toothed blocks with the inner toothed portions of the arm through a rotary motion of the pivotal shaft in a first rotational direction to lock the reclining device, and for causing disengagement of the outer toothed portions from the inner toothed portions through a rotary motion of the pivotal shaft in a second rotational direction opposing the first rotational direction to unlock the reclining device, a return spring for biasing the pivotal shaft in the first rotational direction, and a connecting pipe through which the pivotal shaft fitted to the cam included in the outside reclining device is mechanically linked to the pivotal shaft fitted to the cam included in the inside reclining device, wherein, under a condition where the outside and inside reclining devices are held at their locked positions, a relative distance between the unlocking-action cam-profile surface portion of the cam included in the inside reclining device and the unlocking-action cam-contour surface portion of the toothed block included in the inside reclining device is shorter than a relative distance between the unlocking-action cam-profile surface portion of the cam included in the outside reclining device and the unlocking-action cam-contour surface portion of the toothed block included in the outside reclining device, for providing a mechanical phase-lead of the inside reclining device with respect to both locking and unlocking actions of the outside reclining device. It is preferable that the unlocking-action cam-profile surface portion of the cam of each of the outside and inside reclining devices is formed as an inner peripheral surface of a circumferentially-projected cam-edge portion being continuous with the locking-action cam-profile surface portion, whereas the unlocking-action cam-contour surface portion of the toothed block of each of the outside and inside reclining devices is formed as an outer peripheral surface of a circumferentially-projected cam-edge portion projected in a circumferential direction opposed to the circumferentially-projected cam-edge portion of the cam. More preferably, the unlocking-action cam-profile surface portion of the cam included in the inside reclining device may comprise a circumferentially-offset cam profile surface portion being circumferentially offset with respect to the unlocking-action cam-profile surface portion of the cam included in the outside reclining device by a predetermined circumferential length.

BRIEF DESCRIPTION OF THE DRAWINGS

FIG. 4A is a front elevation view illustrating a rotary cam included in the inside reclining device, whereas FIG. 4B is a front elevation view illustrating a rotary cam included in the outside reclining device.

DESCRIPTION OF THE PREFERRED EMBODIMENTS

Figure 1:
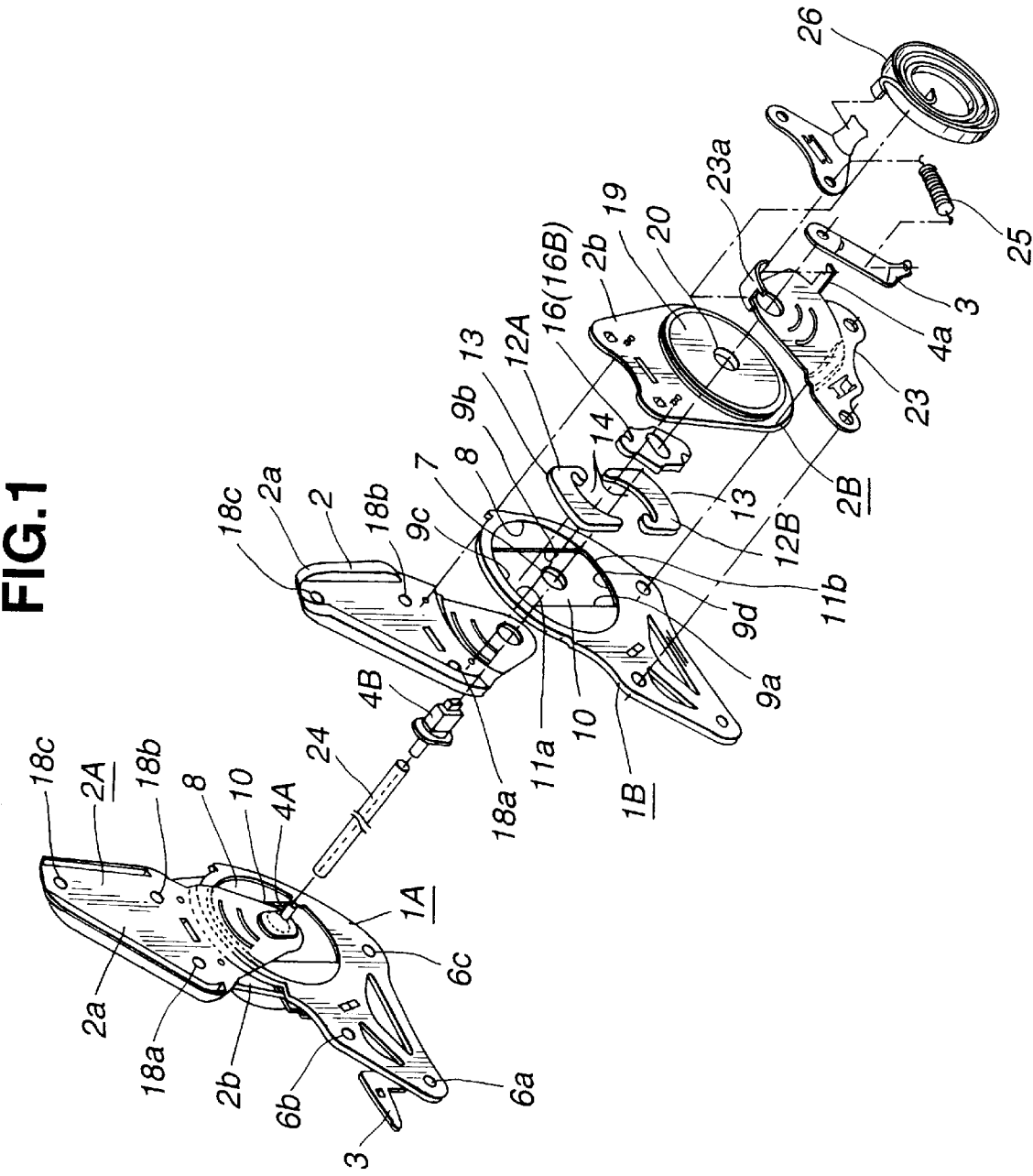
FIG. 1 is a disassembled view illustrating one embodiment of a double-sided reclining apparatus according to the invention.
Figure 2:
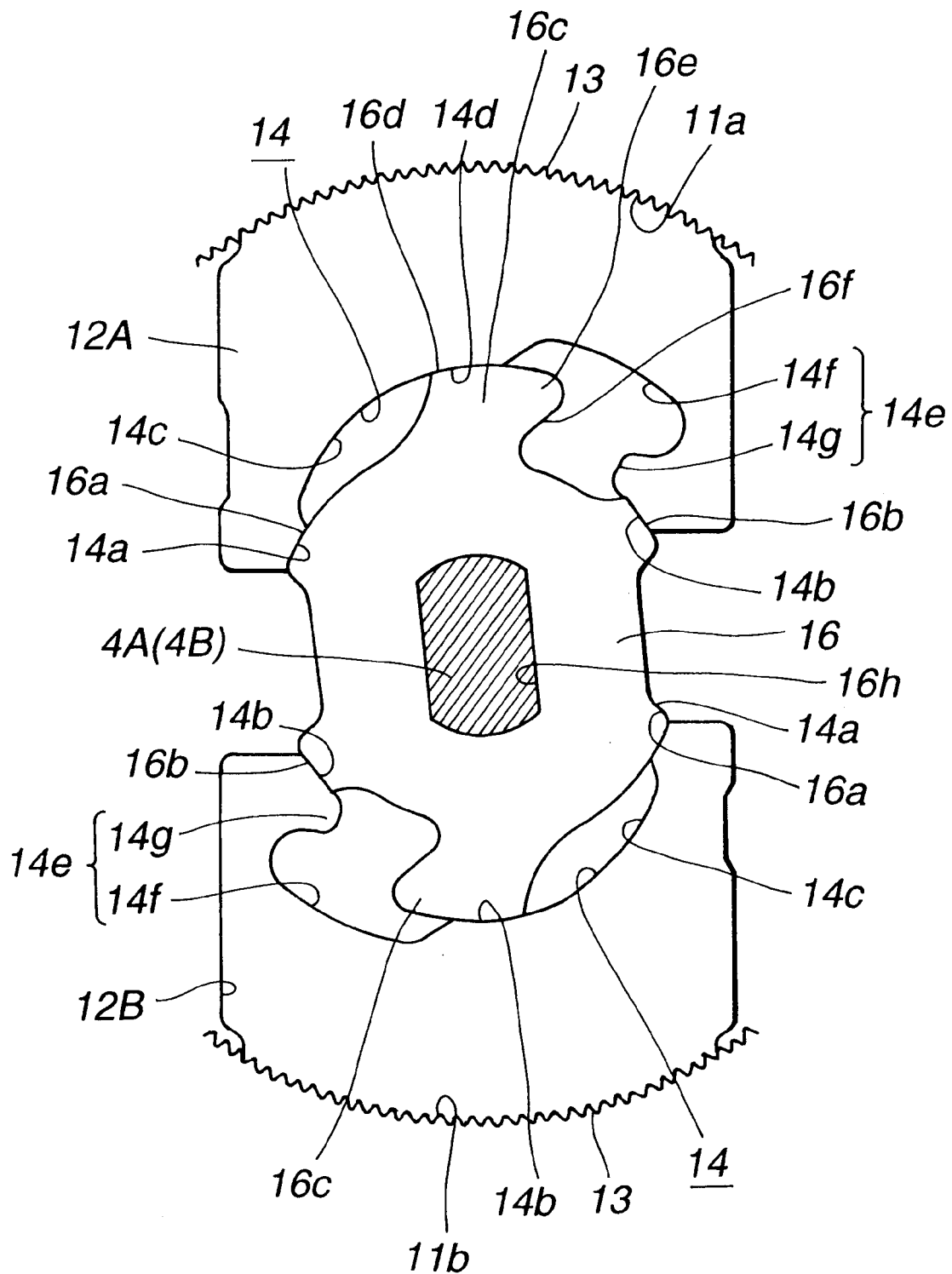
FIG. 2 is an enlarged view illustrating the essential portion of the reclining device of the embodiment.
Figure 3:
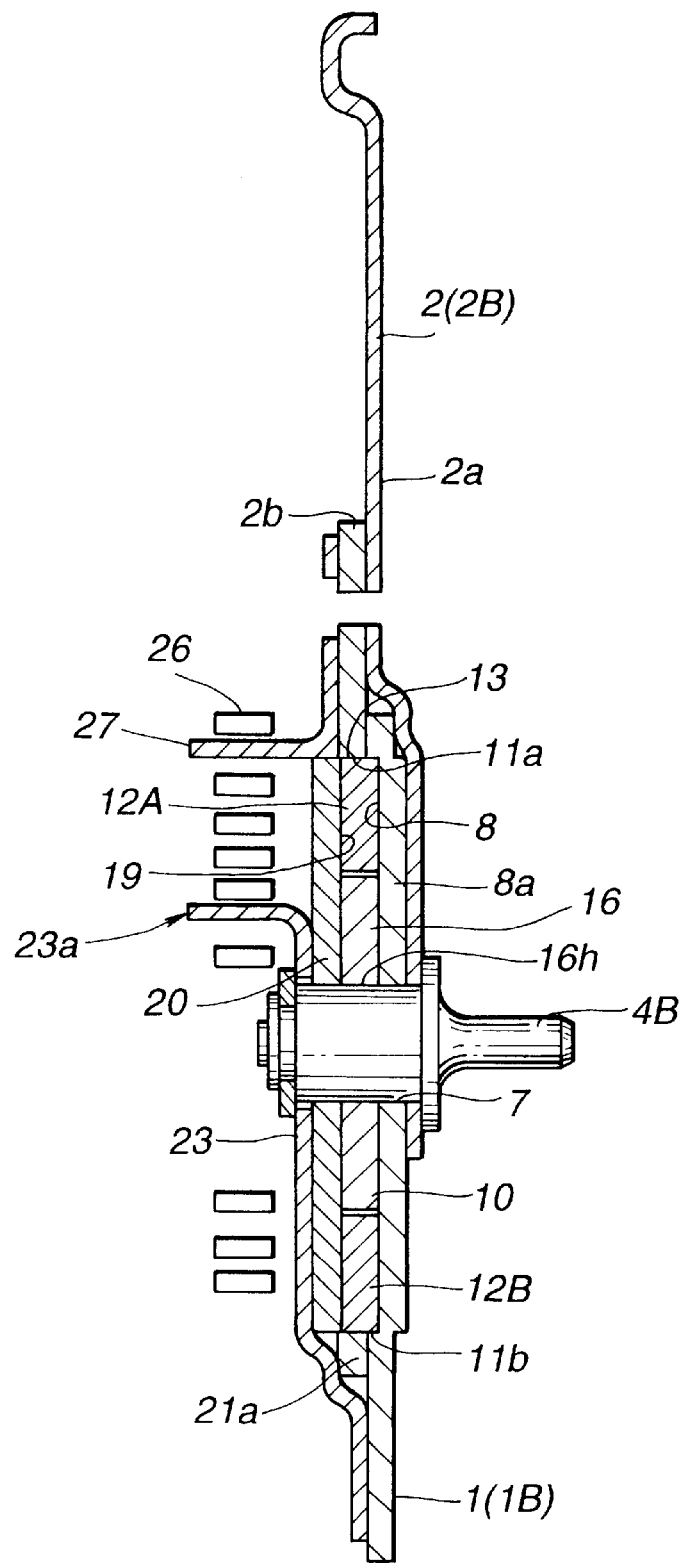
FIG. 3 is a longitudinal cross-sectional view illustrating one reclining device (the inside reclining device not including the reclining lever) of the double-sided reclining apparatus of the embodiment.

Referring now to the drawings, particularly to FIGS. 1 though 3, 4A, 4B, 5A, and 5B, there is shown a double-sided seat reclining apparatus having a pair of rotary-cam type reclining devices. In FIG. 1, the right-hand reclining device having an operating lever 3 but not employing a reclining-lever handle, corresponds to an inner reclining device attached to the inside of a seat cushion 52 (see FIG. 5A) by means of an inside base 1B. The left-hand reclining device having an operating lever 3 and additionally employing a reclining-lever handle, corresponds to an outer reclining device attached to the outside of the seat cushion 52 (see FIG. 5A) by means of an outside base 1A. In the drawings, the character "A" attached to the left-hand side of reference numeral means an "outside", whereas the character "B" attached to the right-hand side of reference numeral means an "inside". The outside reclining device has an outside rotatable arm 2A fixedly connected to the outside of a seat back 51 (see FIG. 5A) and rotatably mounted on an outside pivotal shaft 4A to which the operating lever 3 is fixedly connected. On the other hand, the inside reclining device has an inside rotatable arm 2B fixedly connected to the inside of the seat back 51 and rotatably mounted on an inside pivotal shaft 4B. The two pivotal shafts 4A and 4B are fixedly connected to each other through a connecting pipe 24 by way of serration connection or spline connection. As seen in FIG. 1, the inside base 1B is the mirror image of the outside base 1A. Each of the bases 1A and 1B is formed with a plurality of mounting-bolt holes 6*a*, 6*b*, and 6*c* for firmly securing the base 1A and 1B to the seat-cushion frame by way of bolts, rivets, or the like. Each of the bases (1A; 1B) is formed with a circular recessed portion 8 having a central bore 7 into which the associated pivotal shaft (4A; 4B) is rotatably fitted. As seen in FIGS. 1 and 3, a substantially rectangular recessed toothed-block guide 10 is formed essentially midway of the flat bottom plate 8*a*. The recessed toothed-block guide 10 has a pair of diametrically-opposing elongated side walls 9*a* and 9*b*, an upper circular-arc shaped side wall 9*c* being continuous with upper ends of the side walls 9*a* and 9*b*, and a lower circular-arc shaped side wall 9*d* being continuous with lower ends of the side walls 9*a* and 9*b*. As seen in FIGS. 1 and 3, the upper circular-arc shaped side wall 9*c* is formed with an inner toothed portion 11*a* which is meshable with the outer toothed portion 13 of the upper toothed block 12A (or the upper tooth-inner), whereas the lower circular-arc shaped side wall 9*d* is formed with an inner toothed portion 11*b* which is meshable with the outer toothed portion 13 of the lower toothed block 12B (or the lower tooth-inner). The upper and lower toothed blocks 12A and 12B are guided within the recessed toothed-block guide 10 radially slidably by way of the guide side walls 9*a* and 9*b*. In addition to the outer toothed portion 13, each of the toothed blocks 12A and 12B has a cam-contour surface generally denoted by 14. The cam-contour surface 14 is composed of a plurality of complicated cam-contour surface portions 14*a* to 14*e*, as will be fully described later. As seen in FIG. 2, when the rotary cam 16 and the toothed block pair (12A; 12B) are assembled within the recessed toothed-block guide 10 of the base 1, the cam-contour surface of the upper toothed block 12A and the cam-contour surface of the lower toothed block 12B are point-symmetrical with respect to the axis of the pivotal shaft 4 (or the axis of the central bore 7). As seen in FIG. 2, the cam-contour surface of the toothed block (12A; 12B) is comprised of a substantially 45° up-sloped, raised, curved edge portion 14*a* (see the rightmost end of the lower toothed block 12B of FIG. 2), a substantially 45° down-sloped, raised curved edge portion 14*b* (see the leftmost end of the lower toothed block 12B of FIG. 2), a first curved groove-cut portion 14*c* being continuous with the up-sloped raised edge portion 14*a*, a horizontally-extending moderately-curved intermediate portion 14*d* being continuous with the first curved groove-cut portion 14*c* and having a radius of curvature greater than the respective curved edged portion (14*a*; 14*b*), and a second curved groove-cut portion 14*e* being formed between the down-sloped raised curved edge portion 14*b* and the moderately-curved intermediate portion 14*d*. The intermediate portion 14*d* is used for the locking action of the reclining device, whereas the second groove-cut portion 14*e* is used for the unlocking action of the reclining device. Therefore, the intermediate portion 14*d* will be hereinafter referred to as a "locking-action cam-contour surface portion", whereas the second groove-cut portion 14*e* will be hereinafter referred to as an "unlocking-action cam-contour surface portion". More precisely, the unlocking-action cam-contour surface portion 14*e* consists of a groove cut portion 14*f* being continuous with the locking-action cam-contour surface portion 14*d* and a finger-tip like cam-edge portion 14*g*. On the other hand, the rotary cam 16 is formed with a pair of diametrically-opposed cam-profile surfaces on its outer periphery, such that the upper cam-profile surface of the rotary cam and the cam-contour surface of the upper toothed block 12A are brought into cam-connection, while the lower cam-profile surface of the rotary cam and the cam-contour surface of the lower toothed block 12B are brought into cam-connection. As seen in FIG. 2, each cam-profile surface of the rotary cam 16 comprises a first sloped cam-edge portion 16*a* (see the rightmost end of the rotary cam 16 in the lower half of FIG. 2) abuttable with the substantially 45° up-sloped, raised, curved edge portion 14*a*, a second sloped cam-edge portion 16*b* (see the leftmost end of the rotary cam 16 in the lower half of FIG. 2) abuttable with the substantially 45° down-sloped, raised curved edge portion 14*b*, an undulated intermediate portion 16*c* being formed between the first and second sloped cam-edge portions 16*a* and 16*b*. The intermediate portion 16*c* comprises a slightly-raised intermediate cam-edge portion 16*d* abuttable with the locking-action cam-contour surface portion 14*d*, a finger-tip like cam-edge portion 16*e* being continuous with the intermediate cam-edge portion 16*d*, and a curved groove-cut portion 16*f* formed between the second sloped cam-edge portion 16*b* and the finger-tip like cam-edge portion 16*e* and abuttable with the finger-tip like cam-edge portion 14*g* of the unlocking-action cam-contour surface portion 14*e*. The intermediate cam-edge portion 16*d* cooperates with the toothed-block side locking-action cam-contour surface portion 14*d* to produce the meshed-engagement between the inner toothed portion of the arm 2 and the outer toothed portion 13 of the toothed block 12. Thus, the intermediate cam-edge portion 16*d* will be hereinafter referred to as a "rotary-cam side locking-action cam-profile surface portion". The curved groove-cut portion 16*f* cooperates with the toothed-block side unlocking-action cam-contour surface portion 14*e* to unmesh the outer toothed portion 13 of the toothed block 12 from the inner toothed portion of the arm 2. Thus, the curved groove-cut portion 16*f* will be hereinafter referred to as a "rotary-cam side unlocking-action cam-profile surface portion". As appreciated from the hatched cross-section of FIG. 2, the pivotal shaft 4 has a width-across-flat shaft portion formed by a pair of diametrically-opposing circular-arc faces and a pair of rectangular parallel flat faces. Each of the circular-arc faces serves as a sliding surface which is slidably fitted to the inner peripheral surface of the central bore 20 of the lower arm member 2*b* of the arm 2. The width-across-flat shaft portion of the pivotal shaft 4 permits the cam 16 to be driven in synchronization with the rotary motion of the reclining-lever handle fixedly connected to the end of the pivot shaft. For co-rotation with the pivotal shaft 4, the rotary cam 16 has a substantially rectangular central slot or hole 16*h* fitted onto the width-across flatted shaft portion of the pivotal shaft 4. The substantially rectangular slot 16*h* of the cam 16 is contoured in such a manner as to be fitted onto the width-across flatted shaft portion of the pivotal shaft 4. As seen in FIGS. 1 and 3, the arm 2 is comprised of upper and lower arm members 2*a* and 2*b*. The upper arm member of the arm 2 is formed with a plurality of mounting-bolt holes 18*a*, 18*b*, and 18*c*, for firmly securing the arm to the seat back 51. The lower arm member 2*b* of the arm 2 is formed integral with a ring-gear like portion 19 having a pair of diametrically-opposed circular-arc shaped inner toothed portions (21*a*; 21*a*), which are point-symmetrical with respect to the axis of the pivotal shaft 4. When assembling, the pair of the toothed blocks 12A and 12B are radially slidably accommodated in the internal space defined between the ring-gear like portion 19 of the arm 2 and the recessed toothed-block guide 10, so that the outer toothed portion 13 of each toothed block (12A; 12B) is meshable with the associated inner toothed portion 21a of the arm 2, and so that the rotary cam 16 is rotatably accommodated between the toothed blocks 12A and 12B. The ring-gear like portion 19 is so designed to have an inner diameter identical to the inner diameter of the upper and lower diametrically-opposed circular-arc shaped side walls 9c and 9d. The central bore 20 is formed by boring the central arm portion corresponding to the center of the ring-gear like portion 19. In the shown embodiment, although the arm 2 is formed by integrally connecting the upper and lower arm members 2a and 2b, the arm may be integrally formed as a sole arm member. As seen in FIG. 1, the base (1A; 1B) and the arm (2A; 2B) are integrally connected to each other by caulking the free end of the pivotal shaft 4 from the outside of the reclining device, under a condition where the pivotal shaft (4A; 4B), having a width-across flatted shaft portion, is inserted into the bore 7 of the base (1A; 1B), the hole 16h of the cam 16, the central bore 20 of the arm (2A; 2B), and the width-across-flat hole portion 3a of the operating lever 3. The inside pivot shaft assembly 4B (employing the inside base 1B, the inside rotary cam 16, the inside arm 2B, and the inside operating lever 3) is formed with an armed portion integrally formed with the outside operating lever. On the other hand, the outside pivot shaft assembly 4A (employing the outside base 1A, the outside rotary cam 16, the outside arm 2A, and the outside operating lever 3) is formed with an armed portion integrally formed with the outside operating lever with the reclining-lever handle. The armed portion of each of the pivot shaft assembly has a spring slot (not numbered) at which one hooked end of a return spring 25, such as a coiled tension spring, is hanged. The other hooked end of the return spring 25 is hanged at a bracket 4a of a holder 23, fixedly connected to the associated base, usually by way of riveting. Thus, the operating lever (or the pivotal shaft 4) is biased to its initial position or a spring-biased position by way of the bias of the return spring 25. The holder 23 is further formed integral with a curved stopper portion (not numbered) engaged with the innermost central end of a return spring 26, such as a spiral spring. The outermost curled end of the return spring 26 is engaged with the projected stopper bracket 27 (see FIG. 3) fixed to the lower arm member 2b. The central end of the return spring 26 is engaged with the bracket 23a of the holder 23 fixed to the side wall of the associated base 1. With the previously-noted arrangement, the seat back 51, fixedly connected to the arm, is permanently forced to tilt forwards by means of the bias of the return spring 26 under the unlocked condition of the reclining device. As best seen in FIG. 2, in the double-sided reclining apparatus of the embodiment, each of the left and right rotary-cam type reclining devices has a toothed block (12A; 12B) with a cam-contour surface on its inner periphery, and a rotary cam (16A; 16B) having a cam-profile surface which faces the cam-contour surface, and which contacts the cam-contour surface with a plurality of cam-connection points, so as to ensure a higher mechanical strength of the reclining device and to reliably restrict the sliding motion of the toothed block when the device is in its locking state. In the shown embodiment, the cam-profile surface of the rotary cam 16 is able to contact the cam-contour surface of the toothed block (12A; 12B) with three cam-connection points. Such a locking/unlocking mechanism having a plurality of cam-connection points, can sat-isfactorily restrict the sliding motion of the toothed blocks 12A and 12B in a sliding direction parallel to the side walls of the recessed toothed-block guide 10 formed in the base and satisfactorily restrict the movement of the toothed blocks in a direction perpendicular to the sliding direction, when the toothed blocks are kept at their outermost sliding positions where the outer toothed portions of the toothed blocks are completely meshed with the associated inner toothed portions of the arm.

Figure 5A:
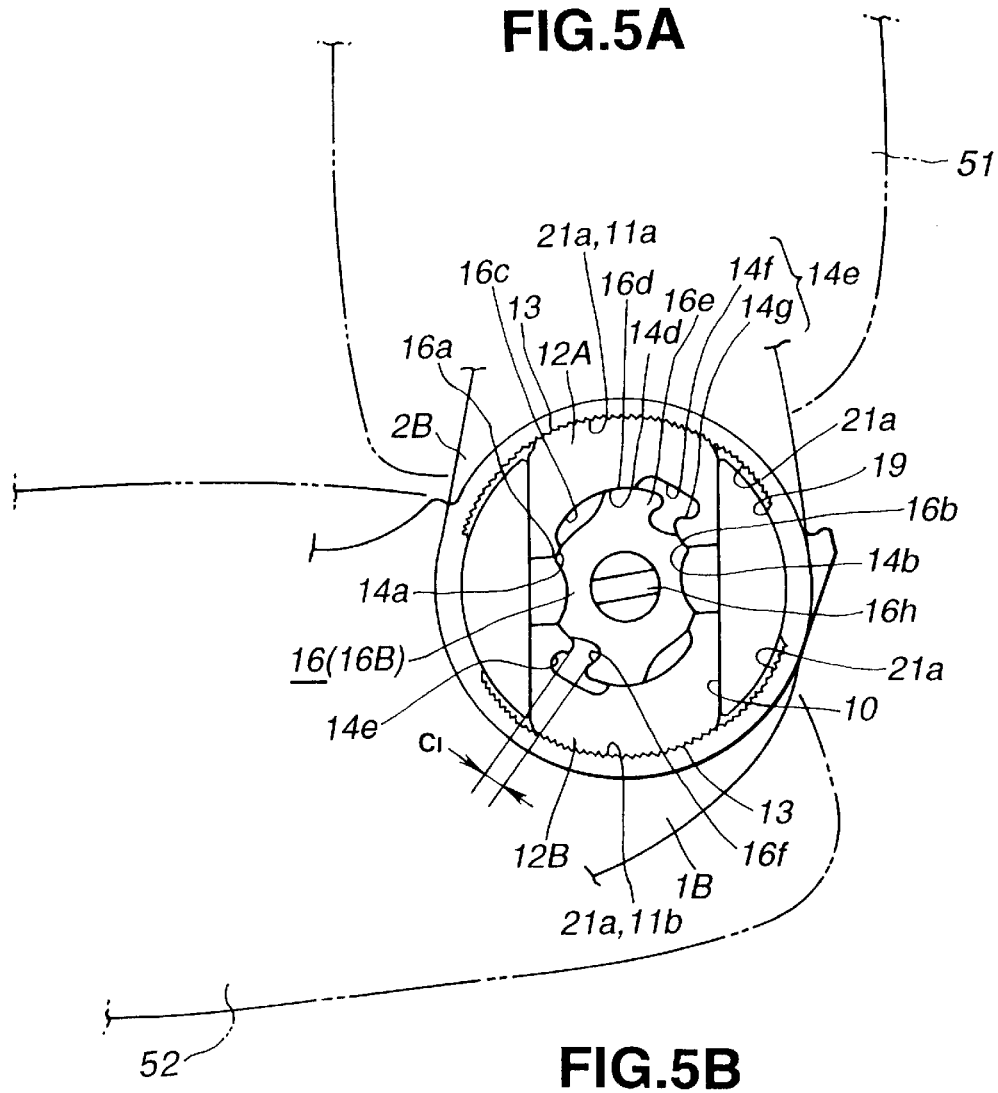
FIG. 5A is an explanatory view illustrating an engaged state of a rotary cam and a toothed-block pair in cam-connection in the locked state of the inside reclining device with the toothed block pair meshed with the arm.
Figure 6A:
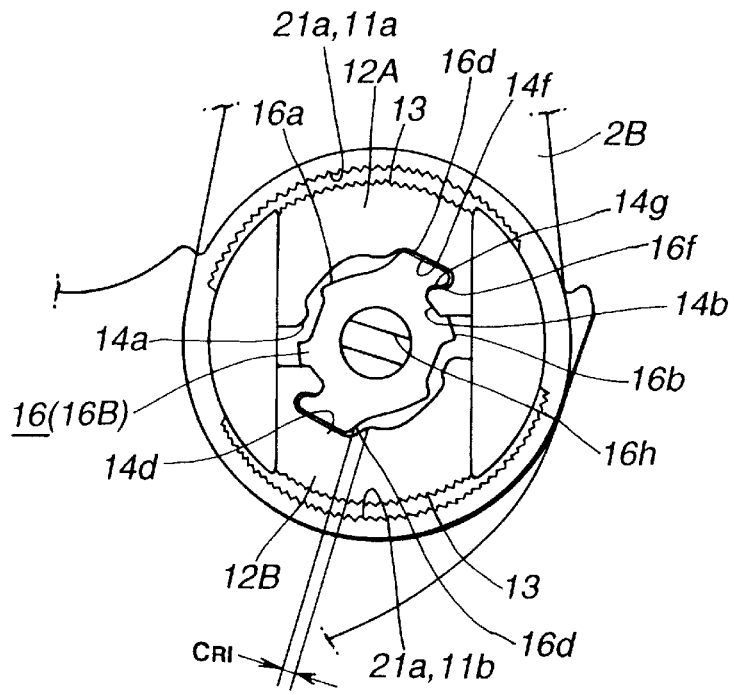
FIG. 6A is an explanatory view illustrating another engaged state of the rotary cam and the toothed-block pair in cam-connection in the unlocked state of the inside reclining device with the toothed block pair unmeshed from the arm.

The double-sided reclining apparatus of the embodiment operates as follows. Returning to FIG. 1, the reclining-lever handle or the operating lever 3 is normally biased to its spring-loaded position (the original position) in the counterclockwise direction (viewing FIG. 1) by way of the bias of the springs 25, and engaged with the holder 23, so that the maximum counterclockwise rotational movement of the reclining lever is restricted by way of the holder 23. Under such a released condition of the lever 3, as seen in FIGS. 5A (showing the locked state of the inside reclining device) and 5B (showing the locked state of the outside reclining device), the first sloped cam-edge portion 16a, the second sloped cam-edge portion 16b and the rotary-cam side locking-action cam-profile surface portion 16d are respectively engaged with and respectively brought into cam-contact with the up-sloped raised edge portion 14a, the down-sloped raised edge portion 14b and the toothed-block side locking-action cam-contour surface portion 14d, by way of the counterclockwise rotation of the pivotal shafts 4A and 4B. Owing to the counterclockwise rotation of the pivotal shafts 4A and 4b, the upper and lower toothed blocks 12A and 12B move radially outwardly, while being guided by the two parallel side walls 9a and 9b within the recessed toothed-block guide 10. Thus, the outer toothed portions 13 of the toothed block pair (12A; 12B) are brought into meshed-engagement with the respective inner toothed portions (21a; 21a) of the arm 2 and also with the respective inner toothed portions (11a; 11b) of the base 1. With the operating lever 3 and the pivotal shafts 4A and 4B held at their initial positions (their spring-loaded positions), the reclining device is held in its completely-locked state where the relative rotational motion of the arm 2 to the base 1 is prevented by meshed-engagement between the toothed-block pair (12A; 12B) and the arm 2. Under the previously-noted completely locked state of the reclining device, the two opposing side walls 12a and 12b of each of the toothed blocks 12A and 12B is slidably fitted to the respective side walls 9a and 9b of the recessed toothed-block guide 10 in addition to the meshed-engagement between the outer toothed portions (13; 13) and the inner toothed portions (21a; 21a) of the arm 2 and the meshed-engagement between the outer toothed portions (13; 13) and the inner toothed portions (11a; 11b) of the base 1. In contrast to the above, for the purpose of shifting from the completely-locked state to the unlocked state, if the reclining-lever handle is pulled up and rotated in its clockwise direction against the bias of the spring, the rotary cam 16 rotates in the clockwise direction as seen in FIGS. 6A (showing the unlocked state of the inside reclining device) and 6B (showing the unlocked state of the outside reclining device). The clockwise rotation of the rotary cam 16 causes the first sloped cam-edge portion 16a, the second sloped cam-edge portion 16b, and the rotary-cam side locking-action cam-profile surface portion 16d to be disengaged from the up-sloped raised edge portion 14a, the down-sloped raised edge portion 14b, and the toothed-block side locking-action cam-contour surface portion 14d. Thereafter, the arm 2 becomes rotated counterclockwise, because the arm is permanently forced to the counterclockwise direction by means of the bias of the return spring 26. In conjunction with the counterclockwise rotation of the rotary cam 16, such counterclockwise rotational motion of the arm 2 produces a radially inward sliding motion or a contracted motion of the toothed-block pair (12A; 12B). In this manner, the outer toothed portions 13 of the toothed block pair are unmeshed from the inner toothed portions (21a; 21a) of the arm 2 and from the inner toothed portions (11a; 11b) of the base 1 by way of the clockwise rotation of the operating lever 3. The unmeshed state corresponds to the unlocked state of the reclining device. Under these conditions, the seat back can be adjusted toward a desired angular position. When the lever 3 is returned to the spring-loaded position with the seat back adjusted at the desired angular position, the rotary cam 16 rotates counterclockwise together with the lever 3. As a result, the toothed blocks 12A and 12B become slid radially outwards, and thus the outer toothed portions (13; 13) of the toothed blocks 12A and 12B are brought again into meshed-engagement with the inner toothed portions (21a; 21a) of the arm 2 and with the inner toothed portions (11a; 11b) of the base 1. In this manner, the angular adjustment of the seat back can be attained.

In the double-sided reclining apparatus of the embodiment, note that the cam profile of the cam included in the inside reclining device is different from the cam profile of the cam included in the outside reclining device, as explained later by reference to FIGS. 4A through 6B. Briefly speaking, as best seen in FIGS. 4A and 4B, the circumferential length $L_I$ of the rotary-cam side locking-action cam-profile surface portion 16d of the inside reclining device (see FIG. 4A) is longer than the circumferential length $L_O$ of the rotary-cam side locking-action cam-profile surface portion 16d of the outside reclining device (see FIG. 4B), and thus the rotary-cam side unlocking-action cam-profile surface portion 16f of the inside reclining device is slightly circumferentially offset with respect to the rotary-cam side unlocking-action cam-profile surface portion 16f of the outside reclining device by a predetermined circumferential distance or length $\Delta L$ ($=L_I-L_O$). That is to say, in the double-sided reclining apparatus according to the invention, the inside-reclining-device cam 16 having a specified circumferentially-offset cam profile surface portion permits a mechanical phase-lead of the inside reclining device with respect to the outside reclining device. As can appreciated from comparison between the clearance or the relative distance $C_I$ shown in FIG. 5A and the clearance or the relative distance $C_O$ shown in FIG. 5B, owing to the specified circumferentially-offset cam profile surface portion of the inside-reclining-device cam 16B, the clearance (the relative distance) $C_I$ between the tip end of the rotary-cam side unlocking-action cam-profile surface portion 16f of the inside reclining device and the tip end of the toothed-block side unlocking-action cam-contour surface portion 14e of the inside reclining device is less than or shorter than the clearance (the relative distance) $C_O$ between the tip end of the rotary-cam side unlocking-action cam-profile surface portion 16f of the outside reclining device and the tip end of the toothed-block side unlocking-action cam-contour surface portion 14e of the outside reclining device.

Figure 6B:
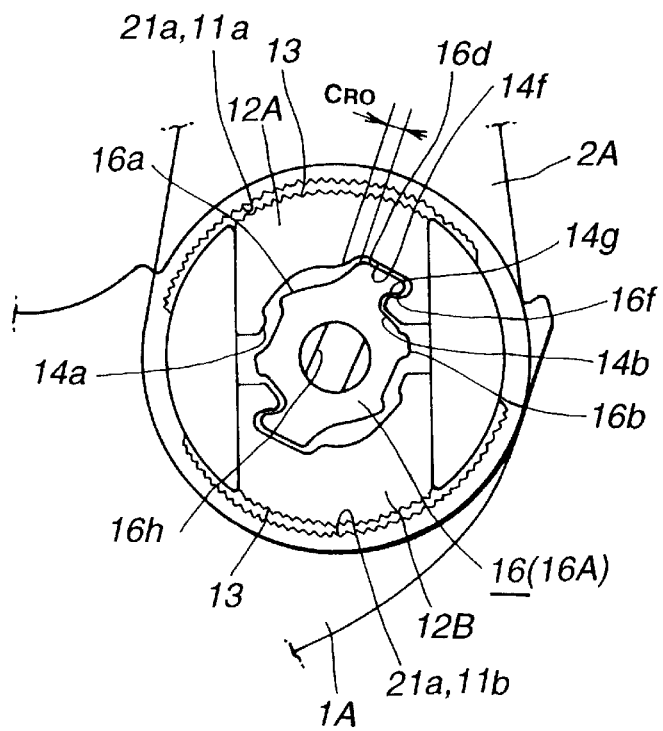
FIG. 6B is an explanatory view illustrating another engaged state of the rotary cam and the toothed-block pair in cam-connection in the unlocked state of the outside reclining device with the toothed block pair unmeshed from the arm.

For the reasons set forth above, when the operating lever 3 is rotated in the clockwise direction by the vehicle occupant and simultaneously the inside-reclining-device cam 16B and the outside-reclining-device cam 16A rotates clockwise, the unlocking-action cam-profile surface portion 16f of the inside-reclining-device cam 16B is, first of all, brought into cam-connection with the substantially 45° down-sloped, raised curved edge portion 14b of the finger-tip like cam-edge portion 14g of the unlocking-action cam-contour surface portion 14e of the toothed block (12A; 12B). The inside-reclining-device toothed blocks 12A and 12B begin to slide radially inward with a mechanical phase lead with respect to the outside-reclining-device toothed blocks. As seen in FIG. 6A, the inside reclining device can shift to the unlocking state at a timing earlier than the outside reclining device. After this, the unlocking-action cam-profile surface portion 16f of the outside-reclining-device cam 16A is brought into cam-connection with the curved edge portion 14b of the finger-tip like cam-edge portion 14g of the unlocking-action cam-contour surface portion 14e of the toothed block (12A; 12B) with a slight mechanical phase lag, with the result that the outside-reclining-device toothed blocks 12A and 12B begin to slide radially inward. As seen in FIG. 6B, the outside reclining device shifts to the unlocking state with the slight phase lag. As previously explained in reference to FIGS. 4A and 4B, in the double-sided reclining apparatus of the embodiment, the circumferential length $L_I$ of the rotary-cam side locking-action cam-profile surface portion 16d of the inside reclining device is longer than the circumferential length LO of the rotary-cam side-locking-action cam-profile surface portion 16d of the outside reclining device, and the rotary-cam side unlocking-action cam-profile surface portion 16f of the inside reclining device is circumferentially offset from the rotary-cam side unlocking-action cam-profile surface portion 16f of the outside reclining device by the predetermined length $\Delta L$ ($=L_I-L_O$), but not radially raised. The circumferential offset $\Delta L$ produces the advantageous mechanical phase lead of the inside reclining device with respect to the outside reclining device. In the reclining apparatus of the embodiment, the cam 16B involved in the inside reclining device has the circumferentially-offset unlocking-action cam-profile surface portion 16f, circumferentially enlarged greater than the cam profile of the cam 16A involved in the outside reclining device, so as to enable a mechanical phase-lead of the inside reclining device with respect to the outside reclining device without providing any radially raised portion on the cam profile surface portion. Thus, the contact area between the rotary-cam side locking-action cam-profile surface portion 16d and the toothed-block side locking-action cam-contour surface portion 14d both included in the inside reclining device is substantially identical to that of the outside reclining device. This insures the same mechanical strength of the locking/unlocking mechanism in both the inside and outside reclining devices. As seen in FIGS. 6A and 6B, when shifting to the unlocking state of the reclining apparatus, owing to the specified circumferentially-offset (or circumferentially-enlarged) cam profile surface portion of the inside reclining device, the radially inward displacement of the inside-reclining-device toothed block (12A; 12B) becomes slightly greater than that of the outside-reclining-device toothed block (12A; 12B). Under the unlocked state of the apparatus, the clearance (or the relative distance) $C_{RI}$ between the locking-action cam-profile surface portion of the inside-reclining-device cam 16B and the associated toothed-block side locking-action cam-contour surface portion 14d becomes less than the clearance (or the relative distance) $C_{RO}$ between the locking-action cam-profile surface portion of the outside-reclining-device cam 16A and the associated toothed-block side locking-action cam-contour surface portion 14d. Owing to the difference between $C_{RI}$ and $C_{RO}$, when shifting from the unlocked state to the locked state, the outside reclining device employing the reclining-lever handle shifts to the locked state with a slight phase lag with respect to the inside reclining device. Under such an unlocked state, when the seat back 51 is rotated by a desired inclination angle, at the same time the rotatable arm 2 also rotates by the desired inclination angle. Due to the rotational motion of the arm 2, the toothed blocks 12A and 12B slide radially inward by way of the force transmitted through the inner toothed portions (21a; 21a) of the arm 2 to the outer toothed portions (13; 13) of the toothed block pair (12A; 12B). As a result, the inner toothed portions of the arm comes out of meshed-engagement with the outer toothed portions of the toothed block pair. Under these conditions, the seat back can be tilted toward the desired angular position. After the desired angular adjustment of the seat back is completed, the vehicle occupant releases the pull-up action of the operating lever 3. At this time, the cams 16 rotate counterclockwise, and as a result the toothed blocks 12A and 12B slide radially outward. The inner toothed portions (11a; 11b) of the recessed toothed-block guide 10 of the base 1 are brought into meshed-engagement with the respective inner toothed portions (21a; 21a) of the arm 2 through the radially-outward motion of the toothed block pair (12A; 12B). In this manner, the double-sided reclining apparatus returns again to the locked-state. Even during return-to-locked, the locking-action cam-profile surface portion 16d of the inside-reclining-device cam 16B can engage with the associated toothed-block side locking-action cam-contour surface portion 14d, with the previously-discussed mechanical phase lead with respect to the outside reclining device, and whereby the inside reclining device first shifts to the locked state (the fully-engaged state), and thereafter the outside reclining device shifts to the locked state with a slight phase lag. As discussed above, owing to the relationship defined by $C_I < C_O$, the inside reclining device can be shifted to the locked state earlier than the outside reclining device having a reclining-lever handle. Also, owing to the relationship defined by $C_{RI} < C_{RO}$, the inside reclining device can be shifted to the unlocked state earlier than the outside reclining device.

Figure 5B:
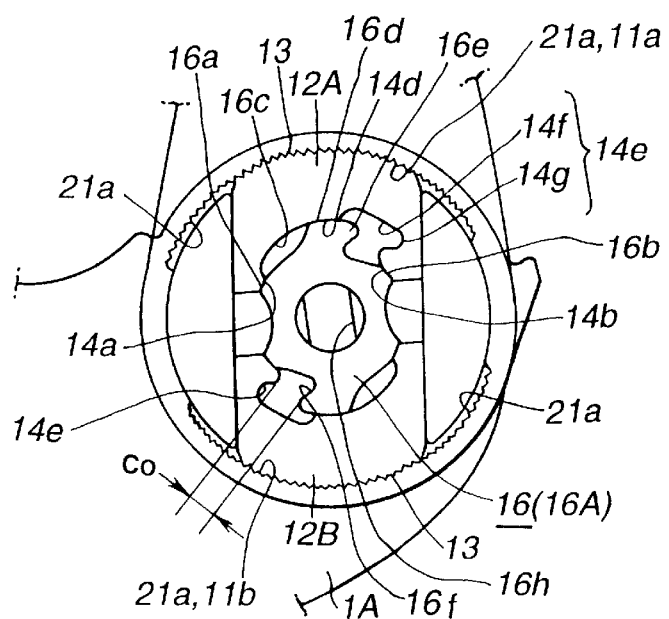
FIG. 5B is an explanatory view illustrating an engaged state of a rotary cam and a toothed-block pair in cam-connection in the locked state of the outside reclining device with the toothed block pair meshed with the arm.

As clearly seen in FIGS. 4A and 4B, actually, the unlocking-action cam-profile surface portion 16f of the cam (16A; 16B) of each of the inner and outer reclining devices is formed so that the unlocking-action cam-profile surface portion 16f is continuous with the locking-action cam-profile surface portion 16d and formed as an inner peripheral surface of a circumferentially-projected or circumferentially-enlarged finger-tip like cam-edge portion 16e. On the other hand, the unlocking-action cam-contour surface portion 14e of the toothed block pair (12A; 12B) of each of the inner and outer reclining devices is formed as an outer peripheral surface of a finger-tip like cam-edge portion 14g projected in a circumferential direction opposed to the circumferentially-projected finger-tip like cam-edge portion 16e. The toothed block pair (12A; 12B) can slide radially inward by engaging the rotary-cam side unlocking-action cam-profile surface portion 16f with the toothed-block side unlocking-action cam-contour surface portion 14e, thereby shifting the reclining devices to their unlocked states. As appreciated from FIGS. 2, 5A and 5B, all showing the locked state of the locking/unlocking mechanism, the locking-action cam-profile surface portion and the locking-action cam-contour surface portion are same in shape and the contact area therebetween is same in both inside and outside reclining devices. Thus, under the locked state, the mechanical strength of the inside reclining device is identical to that of the outside reclining device. Due to the provision of only the circumferentially-projected finger-tip like cam-edge portion 16e of the inside reclining device, the angular phase of the unlocking-action cam-profile surface portion 16f of the inside-reclining-device cam 16B is different from that of the outside-reclining-device cam 16A. This ensures the advantageous mechanical phase-lead of the inside reclining device with respect to the outside reclining device. Alternatively, in order to provide such a mechanical phase lead (that is, the difference between $C_I$ and $C_O$), the finger-tip like portion 14g of the toothed-block side unlocking-action cam-contour surface portion 14e of the inside reclining device may be circumferentially enlarged in the counterclockwise direction. As seen in FIGS. 5A and 5B, under the locked state of the apparatus, in both the inside and outside reclining devices, the contact area between the locking-action cam-profile surface portion 16d and the associated locking-action cam-contour surface portion 14d is substantially same and comparatively wide or large. Under the locked state, for example, if the seat back is heavily loaded by an excessively large impact load owing to collision. The impact load is transmitted to the rotatable arm 2, and thus the arms 2 are also heavily loaded in the clockwise direction. The rotational force acting clockwise and applied to the arms 2 is transmitted through the inner toothed portions (21a; 21a) to the outer toothed portions (13; 13) of the toothed block pair (12A; 12B). Thus, in the case that the vehicle experiences undesirable collision, the toothed blocks tend to be pushed radially inward with heavy load. According to the structure of the locking/unlocking mechanism of the reclining apparatus, the contact area between the locking-action cam-profile surface portion 16d and the associated locking-action cam-contour surface portion 14d is substantially same and comparatively large. This ensures adequate mechanical strength of the locking/unlocking mechanism. Thus, even when the seat back is heavily loaded undesiredly, it is possible to reliably prevent the undesirable radially-inward displacement of the toothed block pair (12A; 12B) by virtue of the previously-discussed large contact area in both the inside and outside reclining devices. This avoids the locked state of the reclining apparatus from being released unintendedly.

Figure 7:
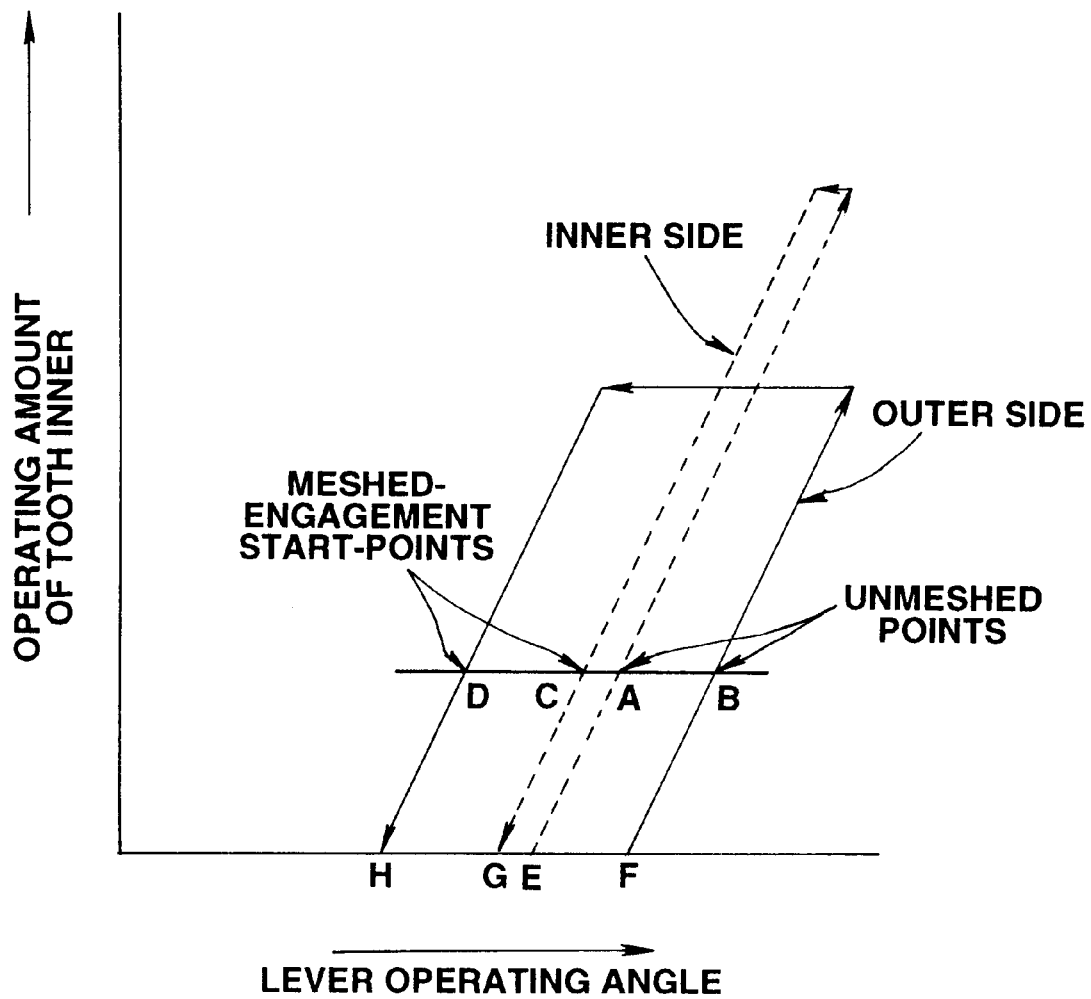
FIG. 7 is a chart showing the relationship between the operating angle of the operating lever and the operating amount or the relative displacement of the tooth-inner component part in both cases, namely the inside and outside reclining devices.

Referring now to FIG. 7, there is shown the lever operating angle versus toothed-block displacement characteristics in both the inside and outside reclining devices. In FIG. 7, the operating characteristic of the inside reclining device is indicated by the solid lines and arrows, whereas the operating characteristic of the outside reclining device is indicated by the broken lines and arrows. The increase in the operating angle of the operating lever 3 means the increase in clockwise rotation of the lever. On the contrary, the decrease in the operating angle of the operating lever 3 means the decrease in counterclockwise rotation of the lever. When the operating lever 3 is rotated in the clockwise direction and then the lever operating angle reaches an angle marked by the point E, the circumferentially-offset, unlocking-action cam-profile surface portion 16f of the cam 16B included in the inside reclining device begins to engage with the groove cut portion 14f of the unlocking-action cam-contour surface portion 14e of the inside-reclining-device toothed block (12A; 12B). Under this condition, when the operating lever 3 is further rotated in the clockwise direction with the increased operating angle, the toothed block pair or the tooth-inner pair (12A; 12B) gradually shift radially inward apart from the respective inner toothed portions (11a; 11b) of the ring-gear like portion 19 of the arm 2. As soon as the relative displacement of each of the toothed blocks to the inner periphery of the ring-gear like portion 19 reaches a predetermined value as indicated by the line segment horizontally passing through the point A in FIG. 7, the outer toothed portions (13; 13) of the toothed block pair (12A; 12B) included in the inside reclining device are unmeshed from the respective diametrically-opposed inner toothed portions (11a; 11b) of the ring-gear like portion 19 of the arm 2. As a result of this, the inside reclining device is unlocked at the lever operating angle corresponding to the point A. On the other hand, in the outside reclining device, with the operating lever rotated clockwise, when the operating angle reaches an angle (marked by the point F) greater than the operating angle such as indicated by the point E, the unlocking-action cam-profile surface portion 16f of the cam 16A included in the outside reclining device begins to engage with the groove cut portion 14f of the unlocking-action cam-contour surface portion 14e of the outside-reclining-device toothed block (12A; 12B) with a specified mechanical phase lag, with respect to the inside reclining device. Then, when the operating lever 3 is further rotated clockwise, the lever operating angle reaches an angle (indicated by the point B) greater than the operating angle such as indicated by the point A, the outer toothed portions (13; 13) of the toothed block pair (12A; 12B) are unmeshed from the respective diametrically-opposed inner toothed portions (11a; 11b) of the ring-gear like portion 19 of the arm 2. As a consequence, the outside reclining device is unlocked at the lever operating angle corresponding to the point B with a slight phase lag. When the operating lever 3 is released (see the uppermost horizontal arrows respectively indicated by the broken line and the solid line) after the maximum operating angle has been reached (see the arrows up-sloped from the points A and B), the operating lever 3 rotates toward it spring-loaded position, that is, in the counterclockwise direction (or in the direction of decrease in the operating angle) by means of the return spring 25. In the case of the inside reclining device, when the operating angle reaches an angle indicated by the point C along the arrow indicated by the broken line, the outer toothed portions (13; 13) of the toothed block pair (12A; 12B) are brought into meshed-engagement with the respective diametrically-opposed inner toothed portions (11a; 11b) of the ring-gear like portion 19 of the arm 2 by way of abutment between the locking-action cam-profile surface portion 16d of the inside-reclining-device cam 16B and the associated toothed-block side locking-action cam-contour surface portion 14d. Thus, the inside reclining device begins to lock at the operating angle corresponding to the point C. On the other hand, in the case of the outside reclining device, when the operating angle reaches an angle indicated by the point D along the arrow down-sloped from the tip of the uppermost horizontal arrow indicated by the solid line, the outer toothed portions (13; 13) of the toothed block pair (12A; 12B) are brought into meshed-engagement with the respective inner toothed portions (11a; 11b) of the arm 2 by way of abutment between the locking-action cam-profile surface portion 16d of the outside-reclining-device cam 16A and the associated toothed-block side locking-action cam-contour surface portion 14d. Therefore, the outside reclining device begins to lock at the operating angle corresponding to the point D. Owing to the specified phase-lead of the inside reclining device with respect to the outside reclining device, resulting from the inside-reclining-device cam 16B having the specified circumferentially-offset cam profile surface portion, the operating angle corresponding to the point D is less than the operating angle corresponding to the point C. These points C and D correspond to the partly-locked-states of the inside and outside reclining devices. Under these conditions, immediately when the point G has been reached from the point C and thus the relative displacement of the toothed block pair (12A; 12B) included in the inside reclining device relative to the ring-gear like portion 19 of the arm 2 becomes reached zero, the inside reclining device is kept in its completely-locked state or full-lock state. On the other hand, in case of the outside reclining device, as soon as the point H (corresponding to an operating angle less than the operating angle indicated by the point G) has been reached from the point C and thus the relative displacement of the toothed block pair (12A; 12B) included in the outside reclining device to the ring-gear like portion 19 of the arm 2 becomes reached zero, the outside reclining device is kept in its completely-locked state. With the previously-discussed arrangement, as regards both the locking-action timing and the unlocking-action timing, the inside reclining device not employing a reclining-lever handle can take priority over the outside reclining device employing a reclining-lever handle. This insures stable reclining-lever action, irrespective of dimensional errors, torsion of the connecting pipe 24, or inadmissible play of the reclining-lever action transmitting linkage. Therefore, the double-sided reclining apparatus according to the invention can insure a good feeling during operation of the reclining apparatus, since the inside reclining device has been locked or unlocked at the time when the driver or passenger has felt a locked or unlocked state of the outside reclining device by his or her hand resting on the reclining-lever handle. Additionally, the mechanical phase-lead of the inside reclining device with respect to the outside reclining device is advantageous in that it is possible to prevent either one of the inside and outside reclining devices from being kept in the insufficient locking/unlocking state, often called "half-lock state" when shifting from the unlocked state to the locked state or vice versa.

Returning to FIGS. 4A and 4B, in the shown embodiment, the shape of the slot 16h of the cam 16B of the inside reclining device is slightly different from that of the slot 16h of the outside-reclining-device cam 16A. Also, the angular position of the inside-reclining-device cam slot 16h is offset from the angular position of the outside-reclining-device cam slot 16h by a predetermined angle such as 90 degrees. At the first glance, the inside-reclining-device cam 16B having a circumferentially-offset cam profile surface portion is very similar to the outside-reclining-device cam 16A not having a circumferentially-offset cam profile surface portion. When installing the inside-reclining-device cam 16B on the width-across-flat shaft portion of the pivotal shaft, there is a possibility that the inside-reclining-device cam component part 16B is erroneously installed on the pivot shaft 4A of the outside reclining device. To avoid this, as seen in FIGS. 4A and 4B, the width-across-flat slot 16h of the inside-reclining-device cam 16B is formed such that the longitudinal axis of the slot 16h of the inside-reclining-device cam 16B is offset from the longitudinal axis of the slot 16h of the outside-reclining-device cam 16A by a specified phase angle, such as 90 degrees, but a multiple of 180 degrees should not be selected as the specified phase angle, since the cam is point-symmetrical to its central axis.

In the shown embodiments, a rotary-cam type reclining device employing a pair of diametrically-opposed two toothed blocks (12A; 12B) being in cam-connection with a rotary cam 16, is exemplified, it will be appreciated that the fundamental concept of the invention may be applied to a rotary-cam type reclining device employing circumferentially equi-distant spaced three or more toothed blocks.

In the shown embodiment, as can be appreciated from the hatched section shown in FIG. 4A, the circumferentially-offset cam profile surface portion of the inside-recliningdevice cam 16B is created or produced by circumferentially displacing or moving the cam profile surface portion (i.e., the unlocking-action cam-profile surface portion 16f) of the outside-reclining-device cam 16A by a specified circumferential displacement $\Delta L$ ($=L_I-L_O$). In other words, the circumferentially-offset cam profile surface portion of the inside-reclining-device cam 16B is obtained by parallel-displacement plus less rotation with respect to the unlocking-action cam-profile surface portion of the outside-reclining-device cam profile. Alternatively, the circumferentially-offset cam profile surface portion of the inside-reclining-device cam 16B may be created by parallel-displacement plus somewhat large rotation with respect to the unlocking-action cam-profile surface portion of the outside-reclining-device cam profile, so that the inclined angle or sloped angle of the engaged portion between the groove cut portion 14f of the toothed-block side unlocking-action cam-contour surface portion 14e and the associated rotary-cam side unlocking-action cam-profile surface portion 16f both included in the inside reclining device are remarkably different from that of the outside reclining device.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A double-sided reclining apparatus, comprising: a first reclining device equipped with a reclining-lever handle and a second reclining device, each comprising:

a base adapted to be fixedly connected to a seat cushion;

an arm adapted to be fixedly connected to a seat back and having a first toothed portion;

a pivotal shaft through which said arm is rotatably supported on said base;

a set of cam and toothed block in cam-connection with each other, said toothed block having a second toothed portion meshable with and unmeshable from the first toothed portion, said cam and said toothed block cooperating with each other for causing meshed-engagement of the second toothed portion with the first toothed portion through a rotary motion of said cam in a first rotational direction to lock the reclining device, and for causing disengagement of the second toothed portion from the first toothed portion through a rotary motion of said cam in a second rotational direction opposed to the first rotational direction to unlock the reclining device; said cam and said toothed block have a plurality of cam-connection points in a cam-profile surface of said cam and a cam-contour surface of said toothed block; and a connecting member through which said cam included in the first reclining device is mechanically linked to said cam included in the second reclining device;

wherein said cam of each of the first and second reclining devices has a locking-action cam-profile surface portion for holding said toothed block at a locked position and an unlocking-action cam-profile surface portion being continuous with the locking-action cam-profile surface portion and provided for sliding said toothed block to an unlocked position, and said toothed block has a locking-action cam-contour surface portion brought into cam-connection with the locking-action cam-profile surface portion, and an unlocking-action cam-contour surface portion brought into cam-connection with the unlocking-action cam-profile surface portion, and wherein, under a condition where the first and second reclining devices are held at their locked positions, a relative distance ($C_I$) between the unlocking-action cam-profile surface portion of said cam included in the second reclining device and the unlocking-action cam-contour surface portion of said toothed block included in the second reclining device is shorter than a relative distance ($C_O$) between the unlocking-action cam-profile surface portion of said cam included in the first reclining device and the unlocking-action cam-contour surface portion of said toothed block included in the first reclining device, for providing a mechanical phase-lead of the second reclining device with respect to both locking and unlocking actions of the first reclining device.

2. The double-sided reclining apparatus as claimed in claim 1, wherein the unlocking-action cam-profile surface portion (16f) of said cam (16A; 16B) of each of the first and second reclining devices is formed as an inner peripheral surface of a circumferentially-projected cam-edge portion (16e) being continuous with the locking-action cam-profile surface portion (16d), whereas the unlocking-action cam-contour surface portion (14e) of said toothed block of each of the first and second reclining devices is formed as an outer peripheral surface of a circumferentially-projected cam-edge portion (14g) projected in a circumferential direction opposed to the circumferentially-projected cam-edge portion (16e) of said cam.

3. A double-sided reclining apparatus for an automobile seat, comprising:

an inside reclining device adapted to face a center line of an automotive vehicle and an outside reclining device equipped with a reclining-lever handle and adapted to face apart from the center line, each of the inside and outside reclining devices comprising:

a base adapted to be fixedly connected to a seat cushion;

an arm adapted to be fixedly connected to a seat back and having a pair of diametrically opposed inner toothed portions;

a pair of toothed blocks, each having at least a locking-action cam-contour surface portion and an unlocking-action cam-contour surface portion, and an outer toothed portion meshable with and unmeshable from an associated one of the inner toothed portions of said arm;

a rotary cam being formed on an outer periphery thereof with at least a locking-action cam-profile surface portion and an unlocking-action cam-profile surface portion respectively being in cam-connection with the locking-action cam-contour surface portion and the unlocking-action cam-contour surface portion;

a pivotal shaft through which said arm is rotatably supported on said base, said pivotal shaft firmly fitted to said cam for causing meshed-engagement of the outer toothed portions of said pair of toothed blocks with the inner toothed portions of said arm through a rotary motion of said pivotal shaft in a first rotational direction to lock the reclining device, and for causing disengagement of the outer toothed portions from the inner toothed portions through a rotary motion of said pivotal shaft in a second rotational direction opposing the first rotational direction to unlock the reclining device;

a return spring for biasing said pivotal shaft in the first rotational direction; and a connecting pipe through which said pivotal shaft fitted to said cam included in the outside reclining device is mechanically linked to said pivotal shaft fitted to said cam included in the inside reclining device;

wherein, under a condition where the outside and inside reclining devices are held at their locked positions, a relative distance ($C_I$) between the unlocking-action cam-profile surface portion of said cam included in the inside reclining device and the unlocking-action cam-contour surface portion of said toothed block included in the inside reclining device is shorter than a relative distance ($C_O$) between the unlocking-action cam-profile surface portion of said cam included in the outside reclining device and the unlocking-action cam-contour surface portion of said toothed block included in the outside reclining device, for providing a mechanical phase-lead of the inside reclining device with respect to both locking and unlocking actions of the outside reclining device.

4. The double-sided reclining apparatus as claimed in claim 3, wherein the unlocking-action cam-profile surface portion (16f) of said cam (16A; 16B) of each of the outside and inside reclining devices is formed as an inner peripheral surface of a circumferentially-projected cam-edge portion (16e) being continuous with the locking-action cam-profile surface portion (16d), whereas the unlocking-action cam-contour surface portion (14e) of said toothed block of each of the outside and inside reclining devices is formed as an outer peripheral surface of a circumferentially-projected cam-edge portion (14g) projected in a circumferential direction opposed to the circumferentially projected cam-edge portion (16e) of said cam.

5. The double-sided reclining apparatus as claimed in claim 4, wherein the unlocking-action cam-profile surface portion (16f) of said cam included in the inside reclining device comprises a circumferentially-offset cam profile surface portion being circumferentially offset with respect to the unlocking-action cam-profile surface portion of said cam included in the outside reclining device by a predetermined circumferential length.

* * * * *